US010862829B2

(12) United States Patent
Meyer et al.

(10) Patent No.: US 10,862,829 B2
(45) Date of Patent: Dec. 8, 2020

(54) CAPACITY-BASED SCALING OF QUEUE-BASED SERVICES

(71) Applicant: Adobe Inc., San Jose, CA (US)

(72) Inventors: Jorg-Christian Wolfgang Meyer, Hamburg (DE); Michael Gebhard Friedrich, Hamburg (DE)

(73) Assignee: Adobe Inc., San Jose, CA (US)

( * ) Notice: Subject to any disclaimer, the term of this patent is extended or adjusted under 35 U.S.C. 154(b) by 215 days.

(21) Appl. No.: 16/165,896

(22) Filed: Oct. 19, 2018

(65) Prior Publication Data

US 2020/0127947 A1     Apr. 23, 2020

(51) Int. Cl.
*H04L 12/861* (2013.01)
*H04L 29/06* (2006.01)
*G06Q 10/06* (2012.01)
*H04L 12/24* (2006.01)
*H04L 29/08* (2006.01)

(52) U.S. Cl.
CPC .............. *H04L 49/90* (2013.01); *H04L 67/10* (2013.01); *G06Q 10/06312* (2013.01); *H04L 41/0806* (2013.01)

(58) Field of Classification Search
CPC ..... H04L 49/90; H04L 67/10; H04L 41/0806; G06Q 10/06312
See application file for complete search history.

(56) References Cited

U.S. PATENT DOCUMENTS

| 10,013,662 B2 * | 7/2018 | Brandwine ........... G06F 9/4881 |
| 2016/0080201 A1 * | 3/2016 | Huang .................. G06F 9/5005 |
| | | 709/221 |

\* cited by examiner

*Primary Examiner* — Brian T O Connor
(74) *Attorney, Agent, or Firm* — SBMC

(57) ABSTRACT

Capacity-based scaling of queue-based resources is described. Initially, a scaling system measures capacity of service processors that are instantiated at a cloud computing service system to provide a service on behalf of a service provider, and also measures a load on these processors. In contrast to conventional scaling systems—which base scalings on a number of queued messages which the instantiated service processors process to provide the service—the scaling system measures the load in terms of not only the number of messages held in a queue but also an input rate of the messages to the queue. The described scaling system then determines whether and by how much to scale the instantiated processors based on this number of messages and input rate. Given this, the scaling system instructs the cloud computing service system how to scale the instantiated service processors to provide the service.

20 Claims, 6 Drawing Sheets

CAPACITY-BASED SCALING OF QUEUE-BASED SERVICES

BACKGROUND

As services provided by service providers continue to evolve, the computing systems used to provide these services have become more complex and the demands on the resources of such systems have increased. For many service providers, continuously updating computing systems to keep up with their evolving services is not feasible. Consequently, many service providers turn to a cloud computing service system to leverage its computing resources in connection with providing services. One way in which service providers leverage the computing resources of a cloud computing service system for asynchronous processing involves instantiation of service processors (e.g., "workers") by the cloud computing service system. Once instantiated, these service processors process a queue of messages, which correspond to requests for a service of the service provider. As a result of processing these messages, the instantiated service processors provide the requested service.

Depending on a current load of requests for a service, the cloud computing service system may scale a number of the instantiated processors up or down. The number of instantiated processors may be scaled up to handle larger loads and down to handle smaller loads. Generally speaking though, as a number of service processors instantiated increases so does a corresponding cost to the service provider of leveraging the cloud computing service system's resources. Due to this, service providers leverage scaling systems to manage a number of service processors instantiated, such that these scaling systems attempt to balance having enough service processors instantiated to maintain a desired quality of service while also constraining a cost of providing the service.

Generally speaking, conventional scaling systems determine whether and how much to scale a number of service processors based on a number of messages held in a corresponding queue over a time interval. Conventional systems may scale up, for instance, according to rules such as "if there are more than five messages in the queue for more than five minutes, then instantiate two new service processors." Another example of the scale up rules used by conventional scaling systems is "if there are more than fifty messages in the queue for more than five minutes, then instantiate ten new service processors." An example of a scaling down rule used by conventional scaling systems is "if there are zero messages in the queue for more than five minutes, then terminate one of the instantiated service processors." Regardless, most cloud computing service systems do support such scaling "out of the box."

By scaling according to such rules, however, the number of service processors determined for handling a load of service requests oscillates wildly because these rules scale down until the number of service processors cannot handle the load anymore, at which point the queue size will rise again. To mitigate effects of this oscillation on quality of service, conventional scaling systems default to instructing cloud computing service systems to keep instantiated a minimum number of service processors that provide significant extra processing capacity to handle a baseline level of requests. Due to this, conventional scaling systems unnecessarily tie up valuable computing resources of cloud computing service systems, resulting in higher costs for the service providers leveraging these resources.

SUMMARY

To overcome these problems, capacity-based scaling of queue-based resources is leveraged in a digital medium environment. Initially, a scaling system measures capacity of service processors that are instantiated at a cloud computing service system to provide a service on behalf of a service provider, and also measures a load on the instantiated service processors. In contrast to conventional scaling systems—which base scalings on a number of queued messages which the instantiated service processors process to provide the service—the scaling system measures the load in terms of not only the number of messages held in a queue but also an input rate of the messages to the queue. The described scaling system then determines whether and by how much to scale the instantiated service processors based on the number of messages held in the queue and the input rate. In accordance with this determination, the scaling system instructs the cloud computing service system how to scale the instantiated service processors to provide the service provider's service. In this way, the scaling system maintains a desired quality of service and reduces the cost of providing the service in relation to conventional systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
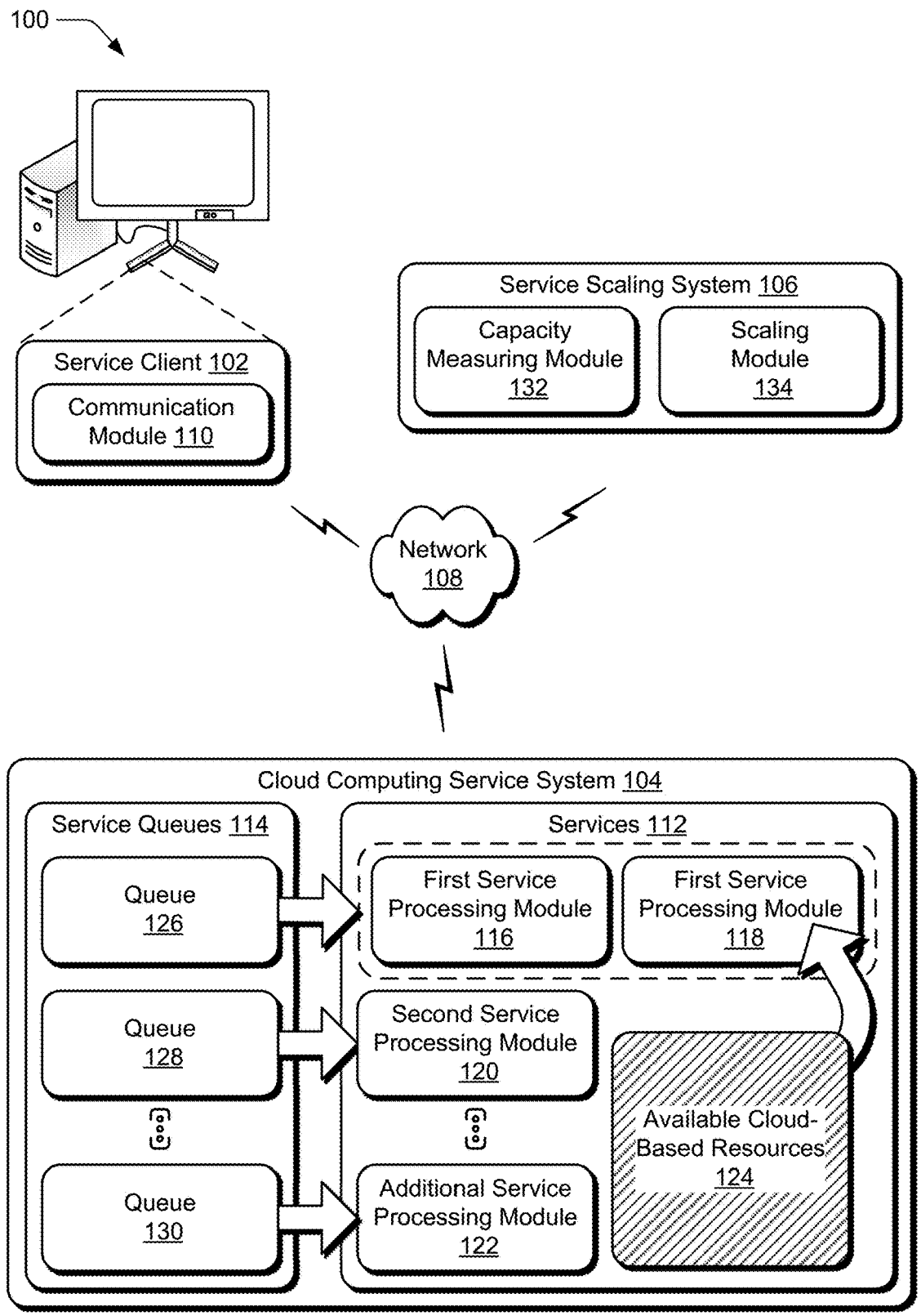
FIG. 1 is an illustration of an environment in an example implementation that is operable to employ techniques described herein.

As services provided by service providers continue to evolve, the computing systems used to provide these services have become more complex and the demands on the resources of such systems have increased. Due to this, many service providers turn to a cloud computing service system to its computing resources in connection with providing services. Depending on a current load of requests for a service, the cloud computing service system may scale up or down a number of service processors instantiated to process a queue of messages, which correspond to requests for service of the service provider.

Conventional scaling systems scale these service processors according to rules which are based on a number of the messages held in the queue. However, scaling in this way causes the number of service processors determined by conventional scaling systems for handling a load to oscillate wildly because these rules scale down until the number of service processors cannot handle the load anymore, at which point the queue size will rise again. To mitigate effects of this oscillation on quality of service, conventional scaling systems default to instructing cloud computing service systems to keep instantiated a minimum number of service processors that provide significant extra processing capacity to handle a baseline level of requests. Due to this, conventional scaling systems unnecessarily tie up valuable computing resources of cloud computing service systems, resulting in higher costs for the service providers leveraging these resources.

To overcome these problems, capacity-based scaling of queue-based resources is leveraged in a digital medium environment. Initially, a scaling system measures capacity of service processors that are instantiated at a cloud computing service system to provide a service on behalf of a service provider. The scaling system also measures a load on the instantiated service processors. However, the scaling system uses different measurements to define a load on instantiated service processors than conventional scaling systems. As noted above, conventional scaling systems base scalings on a number of messages held in a queue. In contrast, the described scaling system bases scalings on not only a number of messages held in the queue, but also on an input rate of messages to the queue. By using this additional metric, the described scaling system is better able than conventional scaling systems to anticipate loads of requests that need to be processed by instantiated service processors. In particular, the scaling system is able to instruct the cloud computing service system to instantiate more service processors before doing so would be too late to meet a desired quality of service, e.g., since instantiating a service processor takes a certain amount of unavoidable time.

In addition to the number of messages in a queue and input rate, the scaling system also measures a processing rate of the instantiated service processors. The scaling system uses these measures—the number of messages, the input rate, and the processing rate—as well as an upper capacity threshold and a lower capacity threshold to determine whether to scale and if so, by how much. In particular, the scaling system determines, in relation to this current processing rate, a relative capacity at which the instantiated service processors would need to operate in order to process the number of messages in the queue given the input rate of messages to the queue.

Broadly speaking, the upper capacity threshold is indicative of a capacity above which the scaling system determines to scale up and the lower capacity threshold is indicative of a capacity above which the scaling system determines to scale down. Consider an example in which the upper capacity threshold is set at 80% and the lower capacity threshold is set at 60%. In this example, if the relative capacity is 85%—indicating that the instantiated service processors would need to operate at 85% of their theoretical capability in order to process the messages in the queue given the input rate—then the scaling system determines to scale up, e.g., since 85% is greater than 80%. On the other hand, if the relative capacity is 57%—indicating that the instantiated service processors would need to operate at just 57% of their theoretical capability in order to process the messages in the queue given the input rate—then the scaling system determines to scale down, e.g., since 57% is less than 60%. The scaling system also determines a number of service processors to instantiate or terminate, in connection with a scale up or scale down, respectively, based on an amount by which the relative capacity surpasses the relevant threshold. Given an 80% upper capacity threshold, for instance, the scaling system determines to instantiate fewer new service processors for a relative capacity of 81% than a relative capacity of 150%. This results in faster and more precise scaling because the required amount of service processors is launched in parallel and unnecessary wait times—due to waiting until the service processors become available for use—are avoided. The scaling system determines to terminate instantiated service processors similarly in relation to the lower capacity threshold.

In accordance with the described techniques, the scaling system generates scaling instructions and provides these scaling instructions to the cloud computing service system. The cloud computing service system effectuates the scaling in accordance with these instructions, e.g., by instantiating a number of service processors specified in the scaling instructions or terminating a number of currently instantiated service processors specified in the scaling instructions. To this end, the scaling system includes in the scaling instructions indications of whether to scale up or scale down the instantiated service processors and also a corresponding number of the service processors to instantiate or terminate. By scaling as described above and below, the scaling system determines scalings in a way that estimates loads on deployed cloud computing resources more closely than conventional techniques. Due to this, the scaling system does not unnecessarily tie up valuable computing resources of cloud computing service systems. Instead, the scaling system minimizes an amount of computing resources tied up to provide a same quality of service in relation to conventional systems. This is due to launching service processors in parallel with a need for their processing. The scaling system thus maintains a desired quality of service and also reduces costs for service providers to provide services in relation to conventional systems.

Term Descriptions

As used herein, "a desired quality of service" refers to a defined condition in relation to which service is provided, such as by providing a particular service within a given amount of time. Consider an example in which the service being provided by instantiated service processors is to generate a thumbnail representation of an image being uploaded for storage. A service provider corresponding to this service may define a desired quality of service as a condition that thumbnail representations are to be generated for images being uploaded in a particular amount of time, e.g., 50 milliseconds. Accordingly, if the instantiated processors take more than 50 milliseconds to generate a thumbnail representation the desired quality of service is not met. Indeed, a "desired quality of service" may be defined in terms of other measures than time without departing from the spirit or scope of the techniques described herein, such as completeness, clarity of digital visual content (e.g., standard definition versus high definition), and so forth.

As used herein, a "service processor" refers to a process at a cloud computing service system that executes various actions associated with a service, namely, processing messages from a queue. The described service processors are examples of "workers," which is a generic term used for processes capable of performing various tasks, such as processing messages of a queue, running scheduled jobs, processing files, generating caches, sending transactional mails, communicating with remote APIs, RSS feed reading and parsing, image processing, and so forth.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ capacity-based scaling of queue-based services as described herein. The illustrated environment 100 includes service client 102, cloud computing service system 104, and service scaling system 106 that are communicatively coupled, one to another, via a network 108. It is to be appreciated that although the service scaling system 106 is illustrated as separate from the service client 102 and the cloud computing service system 104, the service scaling system 106 may additionally or alternately be included as part of the service client 102 or the cloud computing service system 104 without departing from the spirit or scope of the described techniques.

Computing devices that are usable to implement the service client 102, cloud computing service system 104, and service scaling system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service client 102 is illustrated with a communication module 110, which represents functionality of the service client 102 to communicate information to other devices such as service provider systems. In relation to the illustrated environment 100, the communication module 110 represents functionality of the service client 102 to send information to and receive information from the cloud computing service system 104. The communication module 110, for instance, can communicate content data (e.g., digital images, digital videos, digital audio, augmented reality and virtual reality (AR/VR) content, and so forth) to the cloud computing service system 104. Certainly, the communication module 110 enables communication of various other data between the service client 102 and the cloud computing service system 104 without departing from the spirit or scope of the described techniques, including but not limited to, location data, productivity application data (e.g., data associated with word processing documents, spreadsheets, and so forth), social media data, and so on.

In any case, the cloud computing service system 104 represents functionality to provide computing resources (e.g., storage, processing, machine-learning, and so forth) that enable different service providers to provide respective services in relation to data received from their clients. By way of example, the cloud computing service system 104 is capable of providing its computing resources to content creation and management services so that these content creation and management services can provide their services (e.g., functionality to create, edit, and manage digital content) to end user devices. Consider a scenario in which such a content creation and management service enables creation, editing, and management of digital images. Consider also in this scenario that the service client 102 is associated with a user of this content creation and management service. In this scenario, the cloud computing service system 104 can provide storage for the content creation and management service, such that in connection with supporting content creation, editing, and management operations the communication module 110 communicates a digital image to the cloud computing service system 104. The cloud computing service system 104 then leverages its computing resources to store the digital image on behalf of the example content creation and management service. Largely, the provision of computing resources by the cloud computing service system 104 and on behalf of service providers is transparent to users of service clients. In other words, a device user may be unaware that the cloud computing service system 104 provides the computing resources which enable provision of a service provider's services.

In the illustrated environment 100, the cloud computing service system 104 is illustrated having services 112 and service queues 114. Broadly speaking, the services 112 perform operations on messages (not shown) maintained in respective service queues 114. The services 112 may correspond to a variety of operations performed on behalf of a service provider without departing from the spirit or scope of the techniques described herein. In connection with uploading an image, for instance, different services 112 provided with this uploading may include generating a thumbnail representation of the image, generating metadata for the image, performing a virus check on the image, and so forth. In one or more implementations, an individual service 112 corresponds to executable code that is provided by a service provider or selected from the cloud computing service system 104 by the service provider to carry out a limited set of operations, e.g., generate a thumbnail representation of an image being uploaded.

In practice, cloud computing service systems charge service providers more for instantiating more instances of the respective services 112. Due to this, service providers generally attempt to limit a number of the services 112 instantiated on their behalf at a given time. To the extent that a given service 112 is instantiated for a particular service provider, these services 112 also generally "listen" for messages in respective service queues 114, such that one or more of the services 112 are instantiated to handle the messages maintained in a particular service queue 114. In other words, multiple services 112 may be instantiated to handle the messages in a service queue 114 when one service 112 is not enough to handle the messages and deliver a desired quality of service, e.g., by processing messages in the queue within a certain amount of time.

Generally, once a service 112 is available to process a message in the respective service queue 114, the service 112 pulls or requests the oldest message from its respective service queue 114—or the oldest message is alternately pushed to the service 112. In the illustrated example, the services 112 are depicted including first service processing module 116, first service processing module 118, second service processing module 120, and additional service processing module 122. The cloud computing service system 104 also includes available cloud-based resources 124, which can be leveraged to instantiate more services 112 based on requests to do so for a service provider. To this end, the cloud service system 104 represents functionality to instantiate more services 112 using the available cloud-based resources 124 and also to return resources to the available cloud-based resources 124 by terminating services, e.g., when loads of the messages being processed fall below a particular level. In any case, the number of services 112 illustrated is merely for the purpose of explaining capacity-based scaling of queue-based services. Certainly, the cloud computing service system 104 may instantiate different numbers of the services 112 than illustrated without departing from the spirit or scope of the described techniques.

In this example, the service queues 114 are shown including queue 126, queue 128, and queue 130. As noted above, these queues each maintain messages, which correspond to processing jobs that can be processed by the respective services. In one or more implementations, the service queues 114 are configured to receive, hold, and provide messages to the queues in an order in which the messages are received, e.g., first-in, first-out (FIFO). In this way, the services 112 process the oldest messages in the service queues 114 first.

Additionally, each of the service queues 114 is illustrated with an arrow to respective services 112. In particular, the queue 126 is illustrated with a first arrow to a dashed line around the first service processing module 116 and the first service processing module 118, the queue 128 is illustrated with a second arrow to the second service processing module 120, and the queue 130 is illustrated with a third arrow to the additional service processing module 122.

This represents, for instance, that the queue 126 corresponds to a first service, which the first service processing modules 116, 118 are configured to provide by processing messages from the queue 126. Moreover, the inclusion of both the first processing service modules 116, 118 in the illustrated example indicates that instantiation of just a single first service processing module is not suitable to satisfy a quality of service desired in connection with the first service. Similar to the first service processing modules 116, 118, the second service processing module 120 processes messages from the queue 128 to provide a second service and the additional service processing module 122 processes messages from the queue 130 to provide an additional service. The illustrated ellipses indicate that the cloud computing service system 104 is capable of providing more (or fewer services) and thus that it may include more corresponding service queues 114 and services 112 without departing from the spirit or scope of the described techniques. In the context of instantiating and terminating the services 112, consider the following discussion of the service scaling system 106.

The service scaling system 106 includes capacity measuring module 132 and scaling module 134. The capacity measuring module 132 and the scaling module 134 represent functionality to measure a capacity at which the services 112 are processing messages of the service queues 114 and functionality to cause the cloud computing service system 104 to scale (e.g., up or down) the number of services 112, respectively. In contrast to conventional systems, which are limited to considering the messages maintained in the queue for determining whether to scale services up or down, the service scaling system 106 considers not only (1) a number of messages in a given service queue 114, but also (2) an input rate (e.g., messages input to the given service queue 114 over a certain amount of time) and (3) capacity of an instance of the services 112 (e.g., a number of messages a given service processing module is capable of processing over a certain amount of time).

By scaling based on capacity rather than solely on messages held in the queues, the service scaling system 106 can provide service which substantially meets a desired quality of service even when a spike in messages (e.g., peak loads) to be processed occurs. The manner of scaling performed by the service scaling system 106 also limits the number of services instantiated so that a service provider does not pay needlessly for underutilized resources—the services 112 that are instantiated but operate at such a low capacity that they could be terminated without negatively affecting the desired quality of service.

Having considered an example environment, consider now a discussion of some example details of the techniques for capacity-based scaling of queue-based resources in a digital medium environment in accordance with one or more implementations.

Capacity-Based Scaling of Queue-Based Services

Figure 2:
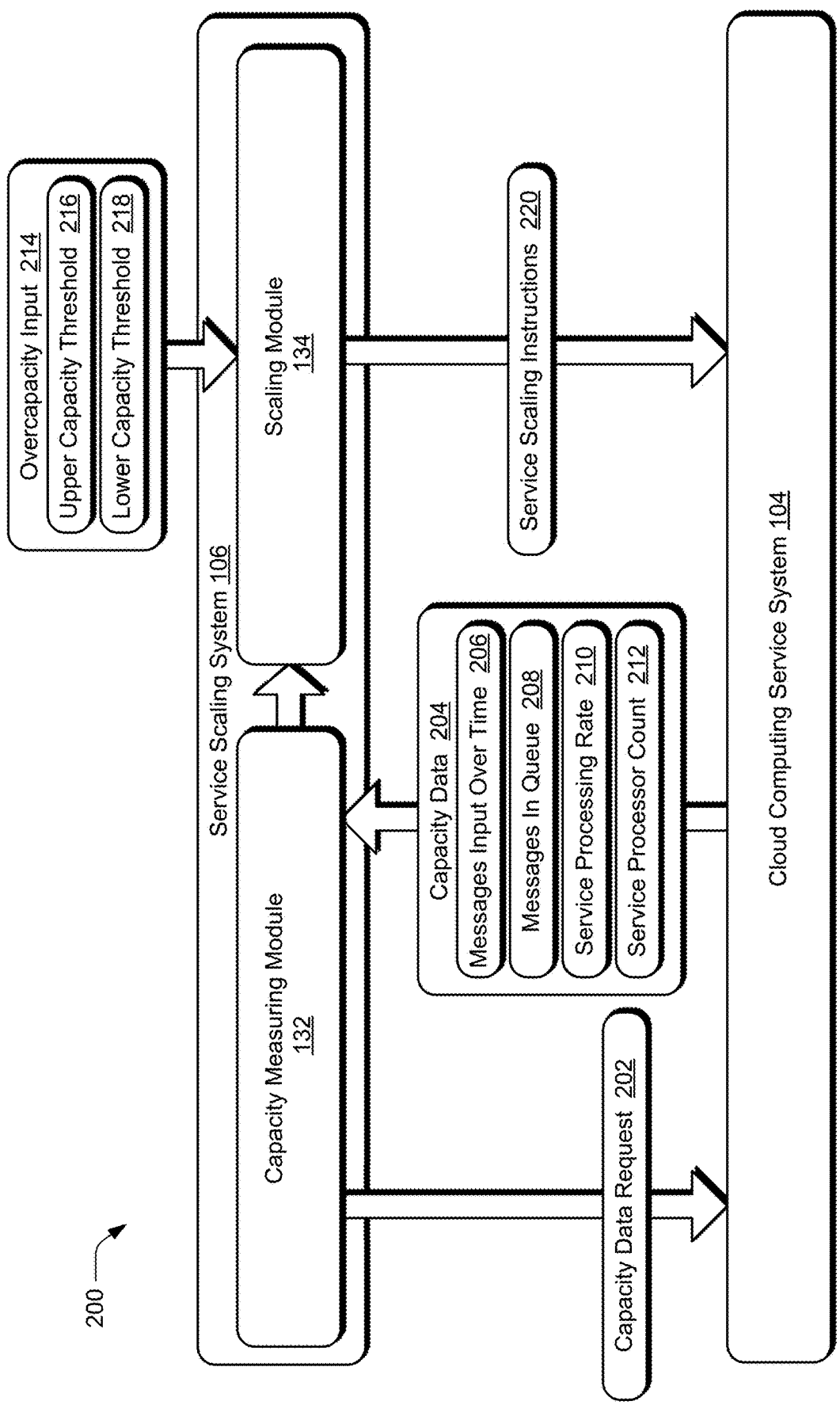
FIG. 2 depicts an example implementation in which the service scaling system of FIG. 1 generates instructions for scaling services at a cloud computing service system.

FIG. 2 depicts an example implementation 200 in which a service scaling system of FIG. 1 generates instructions for scaling services at a cloud computing service system. The illustrated example 200 includes from FIG. 1 the cloud computing service system 104 and the service scaling system 106 having the capacity measuring module 132 and the scaling module 134.

As discussed briefly above, the capacity measuring module 132 represents functionality to measure a capacity at which the services 112 are processing messages of the service queues 114. In this context, the capacity measuring module 132 is illustrated communicating capacity data request 202 to the cloud computing service system 104. The capacity data request 202 requests information from the cloud computing service system 104 pertaining to a capacity of the services 112 and which the scaling module 134 can use to determine whether to scale up, keep the same, or scale down an instantiated number of services 112 providing particular functionality, e.g., the first service, the second service, the additional service, and so forth.

In accordance with the described techniques, the cloud computing service system 104 includes functionality to provide the requested information to the capacity measuring module 132 responsive to the capacity data request 202. The ability to request capacity data and provide it to the capacity measuring module 132 may be facilitated by use of an application programming interface (API) of the cloud computing service system 104, although other techniques for implementing this functionality are also contemplated. The capacity data 204 represents the information that the cloud computing service system 104 provides to the capacity measuring module 132 based on the capacity data request 202.

Broadly speaking, the capacity data 204 describes a capacity at which the services 112 are operating and statistics about messages in the service queues 114. In this example 200, the capacity data 204 includes messages input over time 206, messages in queue 208, service processing rate 210, and service processor count 212. The capacity data 204 may describe this information for one or more services provided and respective queue and service processing modules. The messages input over time 206 data describes messages input to a queue for a provided service over an amount of time, e.g., messages input to the queue 126 for the first service over the last 5 minutes. The messages in queue 208 data describes a number of messages held in the queue for a provided service at a time of the request, e.g., a number of messages held in the queue 126 at the time the capacity data request 202 is received.

It should be noted that conventional techniques are generally limited to considering the number of messages held in a queue—they do not consider the other information requested and indicated by the capacity data 204. The service processing rate 210 describes a rate at which an instantiated service 112 processes messages from a respective service queue 114, e.g., a rate at which the first service processing module 116 processes messages from the queue 126. Additionally or alternately, the service processing rate 210 describes a combined rate at which all the instantiations of a service process messages from a respective service queue 114, e.g., a rate at which a combination of the first service processing module 116 and the first service processing module 118 process messages from the queue 126. The service processor count 212 describes a number of services 112 that are instantiated for processing messages from a respective service queue 114.

Using this information and overcapacity input 214, the scaling module 134 determines whether to scale up or down numbers of service processing modules instantiated to provide a given service. In addition to determining whether to scale up or down, the scaling module 134 also determines how many service processing modules to instantiate or terminate based on whether a scale up or scale down is determined.

The overcapacity input 214 represents data describing a capacity at which a service provider (e.g., a content creation service provider) would like one or more of its services to operate under normal conditions—leaving additional capacity for processing messages due to load spikes. A service provider may specify that its service processing modules are to operate, generally, at 70%, leaving 30% for when a spike in the load is received.

The overcapacity input 214 can specify different capacities for different services. In the context of FIG. 1, for instance, the overcapacity input 214 may specify different capacities for the processing modules of the first service (e.g., the first service processing modules 116, 118), the processing modules of the second service (e.g., the second service processing module 120), and the processing modules of the additional service (e.g., the additional service processing module 122). By way of example, the overcapacity input 214 may describe that the first service processing modules 116, 118 are generally to operate at 70%, the second service processing module 120 is generally to operate at 90%, and the additional service processing module 122 is generally to operate at 40%. These capacities may vary for a variety of reasons, such as a quality of service desired by the service provider, whether requests for the service are relatively stable, whether the number of requests swings greatly (e.g., from receiving many requests over a short time span to receiving very few requests to remaining relatively steady), whether swings in the number of requests are predicable or unpredictable, and so forth.

In this example, the overcapacity input 214 is illustrated with upper capacity threshold 216 and lower capacity threshold 218. The upper capacity threshold 216 is indicative of a capacity of operation of the service processing modules at which the scaling module 134 instructs the cloud computing service system 104 to scale up—to instantiate at least one service processing module. In contrast, the lower capacity threshold 218 is indicative of a capacity level of the service processing modules at which the scaling module 134 instructs the cloud computing service system 104 to scale down—to terminate at least one instantiated service processing module.

Consider a scenario in which a service provider desires the service processing modules instantiated on its behalf to operate generally at 70%. In this scenario, the upper capacity threshold 216 and the lower capacity threshold 218 may be set at 80% and 60%, respectively. Thus, in this scenario, when capacity of the service provider's service processing modules exceeds 80%, the service scaling system 106 instructs the cloud computing service system 104 to instantiate one or more additional service processing modules. On the other hand, when capacity of the service provider's service processing modules falls below 60%, the service scaling system 106 instructs the cloud computing service system 104 to terminate one or more of the instantiated service processing modules.

Broadly speaking, service scaling instructions 220 represent data instructing the cloud computing service system 104 to instantiate a specified number of service processing modules or terminate a specified number of instantiated service processing modules. In other words, the service scaling instructions 220 are effective to control the cloud computing service system 104 to instantiate and terminate described numbers of the service processing modules.

In one or more implementations, the scaling module 134 determines how to scale up and scale down the services 112 in accordance with the following discussion. In general, the following terms and algorithms describe how the scaling module 134 determines when to scale up or scale down in relation to a queue associated with a particular service, e.g., the first service, the second service, or the additional service. For instance, the following terms and algorithms describe how the scaling module 134 determines when and by how much to instruct the cloud computing service system 104 to scale up or down in relation to the queue 126.

In this discussion, the term InputRate corresponds to the messages input over time 206 and describes a number of messages sent to a given queue in a certain time interval, e.g., in terms of messages per minute. The term QueueSize corresponds to the messages in queue 208 and describes a number of messages in the given queue at a time of the capacity data request 202. The term TotalLoad corresponds to a combined input metric used to determine scaling, and the scaling module 134 determines the TotalLoad as a function of the InputRate and the QueueSize. In one or more implementations, for instance, the scaling module 134 computes the TotalLoad by summing the InputRate and the QueueSize according to the following:

$$\text{TotalLoad} = \text{InputRate} + \text{QueueSize}$$

Continuing, the term NumberofInstances corresponds to the service processor count 212 and refers to a total number of service processing modules instantiated to process messages in connection with providing a respective service, e.g., thumbnail representation generation. The term TotalWorkerCapacity corresponds to the service processing rate 210 and describes a total actual processing capacity of all service processing modules that are instantiated to process messages in connection with providing a respective service, e.g., in terms of messages per minute.

Based on these metrics, which are described by the capacity data 204, the scaling module 134 also computes values for various input parameters, including InstanceCapacity, LowWaterMark, HighWaterMark, ScaleUpFactor, and ScaleDownFactor. The InstanceCapacity parameter is an average processing capacity per time interval per service processing module. The value of the InstanceCapacity parameter may be expressed in terms of messages per minute per service processing module, or in formula form as:

$$InstanceCapacity = \frac{messages}{minute \times service\ processing\ module}$$

The LowWaterMark parameter is a percent value of a current load and corresponds to a value described by the upper capacity threshold 216. The service scaling system 106 compares the TotalWorkerCapacity to the LowWaterMark parameter. If the scaling module 134 determines that the TotalWorkerCapacity is less than the LowWaterMark parameter—determines that the number of messages being completed by the instantiated service processing modules is less than a threshold number of messages corresponding to a computed number of service processing modules operating at the percentage indicated by the LowWaterMark—the service scaling system 106 determines to scale up the services 112. In other words, if the instantiated service processing modules are not processing at least the LowWaterMark's worth of messages, the scaling module 134 determines to scale up a number of instantiated service processing modules.

The HighWaterMark parameter is also a percent value of a current load, but corresponds to a value described by the lower capacity threshold 218. The service scaling system 106 compares the TotalWorkerCapacity to the HighWaterMark parameter. If the scaling module 134 determines that the TotalWorkerCapacity is greater than the HighWaterMark parameter—determines that the number of messages being completed by the instantiated service processing modules is greater than a threshold number of messages corresponding to a computed number of service processing modules operating at the percentage indicated by the HighWaterMark—the service scaling system 106 determines to scale down the services 112. In other words, if the instantiated service processing modules are processing more than the HighWaterMark's worth of messages, the scaling module 134 determines to scale down a number of instantiated service processing modules.

The ScaleUpFactor describes a proportional factor computed by the scaling module 134 when it determines to scale up the number of instantiated service processing modules. In contrast, the ScaleDownFactor describes a proportional factor computed by the scaling module 134 when it determines do scale down the number of instantiated service processing modules. The scale factors can be used to fine tune scaling sensitivity to balance operational costs versus service quality. In one or more implementations, the scaling module 134 computes a TargetCapacityUpscale as a function of the TotalLoad and the LowWaterMark, such as according to the following:

$$TargetCapacityUpscale = TotalLoad \times \left(1 + \frac{LowWaterMark}{100}\right)$$

In general, the TargetCapacityUpscale represents a computed number of service processing modules needed to handle the TotalLoad and to reduce the InstanceCapacity so that it falls within the defined thresholds, e.g., within the upper and lower capacity thresholds 216, 218. In one or more implementations, the scaling module 134 computes a TargetCapacityDownscale as a function of the TotalLoad and the HighWaterMark, such as according to the following:

$$TargetCapacityDownscale = TotalLoad \times \left(1 + \frac{HighWaterMark}{100}\right)$$

In general, the TargetCapacityDownscale represents a computed number of service processing modules needed to handle the TotalLoad and to increase the InstanceCapacity so that it falls within the defined thresholds, e.g., within the upper and lower capacity thresholds 216, 218. In accordance with the described techniques, the scaling module 134 is also configured to compute simply a TargetCapacity as a function of the TargetCapacityUpscale and the TargetCapacityDownscale. By way of example, the scaling module 134 computes the TargetCapacity according to the following:

$$TargetCapacity = \frac{TargetCapacityUpscale + TargetCapacityDownscale}{2}$$

The scaling module 134 also represents functionality to compute the TotalWorkerCapacity as a function of the NumberofInstances and the InstanceCapacity. By way of example, the scaling module 134 computes the TotalWorkerCapacity according to the following:

TotalWorkerCapacity=NumberofInstances×InstanceCapacity

Responsive to a determination to scale up, e.g., when the scaling module 134 determines that the TargetCapacityUpscale is greater than the TotalWokerCapacity, the scaling module 134 determines a number of service processing module instances to instantiate. By way of example, the scaling module 134 determines the number of service processing module instances to instantiate according to the following equation:

$$NoToStart = \frac{(TargetCapacity - TotalWorkerCapacity)}{InstanceCapacity} \times ScaleUpFactor$$

Here, the term NoToStart represents the number of service processing module instances to instantiate in connection with the scale up.

Responsive to a determination to scale down, e.g., when the scaling module 134 determines that the TargetCapacityDownscale is less than the TotalWokerCapacity, the scaling module 134 determines a number of currently instantiated service processing modules to terminate. By way of example, the scaling module 134 determines the number of service processing module instances to terminate according to the following equation:

$$NoToStop = \frac{(TargetCapacity - TotalWorkerCapacity)}{InstanceCapacity} \times ScaleDownFactor$$

Here, the term NoToStop represents the number of service processing module instances to terminate in connection with the scale down. Based on this, the scaling module 134 generates the service scaling instructions 220 to indicate whether the cloud computing service system 104 is to scale up or scale down a number of service processing modules instantiated for a given service. In the service scaling instructions 220, the scaling module 134 also includes the NoToStart or the NoToStop. Responsive to receiving the service scaling instructions 220, the cloud computing service system 104 instantiates or terminates service processing modules accordingly. By instantiating and terminating service processing modules in this way, the described system handles requests for service in a way that both maintains a quality of service for a current load and also eliminates spending by service providers on cloud-based resources that are unnecessary for handling the current load. In this context, consider FIG. 3.

Figure 3:
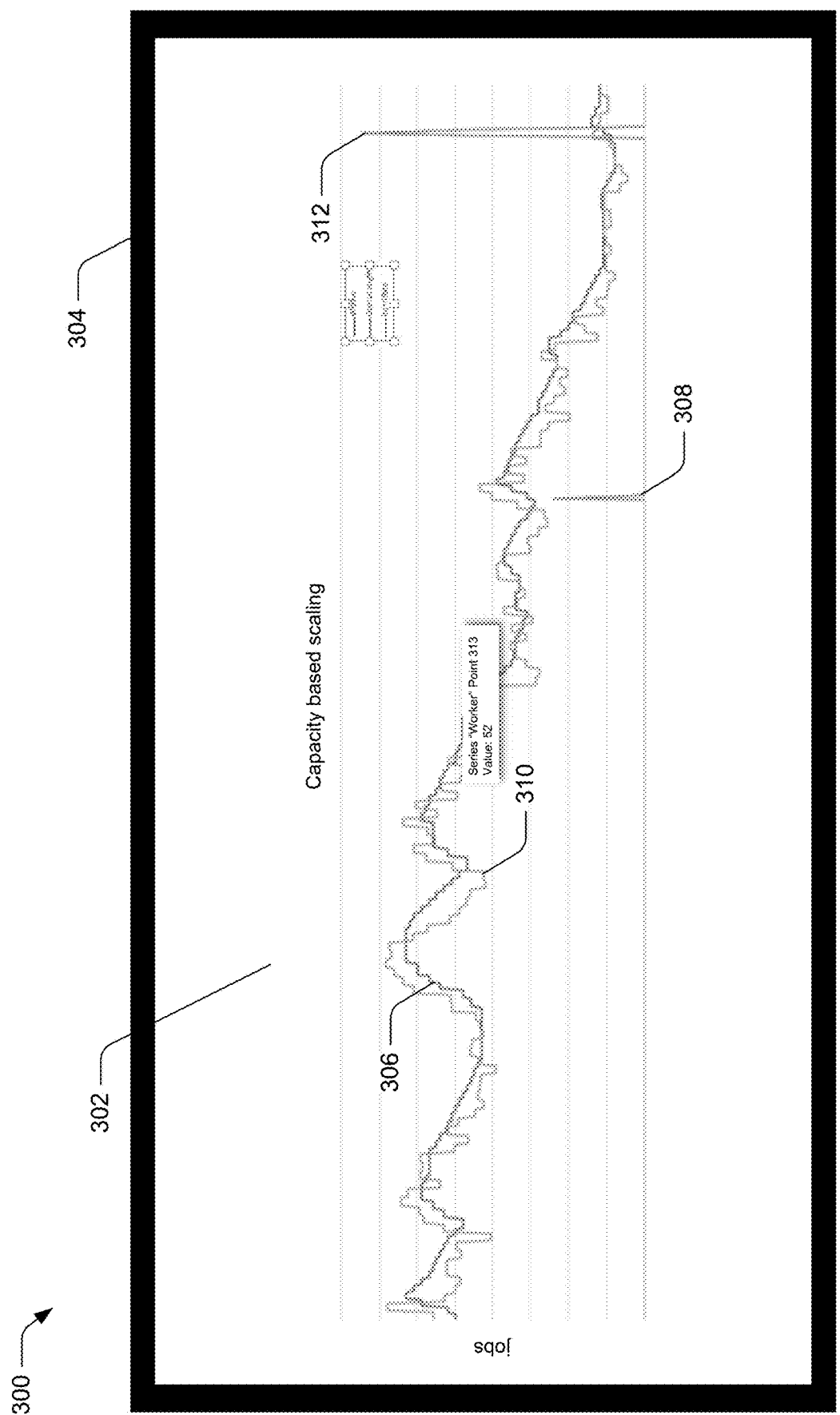
FIG. 3 depicts an example user interface via which representations of service capacity, messages in service queues, and message input rate are presented.

FIG. 3 depicts an example 300 of a user interface via which representations of service capacity, messages in service queue, and message input rate are presented.

The illustrated example 300 includes a load-handling interface 302 displayed via display device 304. In this example 300, the load-handling interface 302 is depicted including representations over an interval of time of capacity of service processing modules of a given service, messages in the given service's queue, and an input rate of the messages into the given service's queue. In particular, capacity line 306 represents the capacity of service processing modules of a given service, queued line 308 represents the messages in the given service's queue, and input-rate line 310 represents the rate of the messages into the given service's queue. In this example, the queued line 308 rises above the capacity line 306 only once, at peak 312, which indicates that the given service's instantiated service processing modules are generally capable of handling the load of incoming messages within a range of desired capacity, e.g., as defined by the upper and lower capacity thresholds 216, 218.

In one or more implementations, the service scaling system 106 includes functionality to generate the load-handling interface 302. The load-handling interface 302 generally represents how the service processing modules instantiated at the cloud computing service system 104, and according to instructions from the scaling module 134, handle a current load of requests for service, where the service is requested based on messages input in the service queues 114. Turning back to FIG. 1, the current load of requests for service correspond to messages from service clients 102 for particular services, e.g., thumbnail representation generation.

Having discussed example details of the techniques for capacity-based scaling of queue-based resources, consider now some example procedures to illustrate additional aspects of the techniques.

Example Procedures

This section describes example procedures for capacity-based scaling of queue-based resources in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service scaling system 106 of FIG. 1 that makes use of a capacity measuring module 132 and a scaling module 134.

Figure 4:
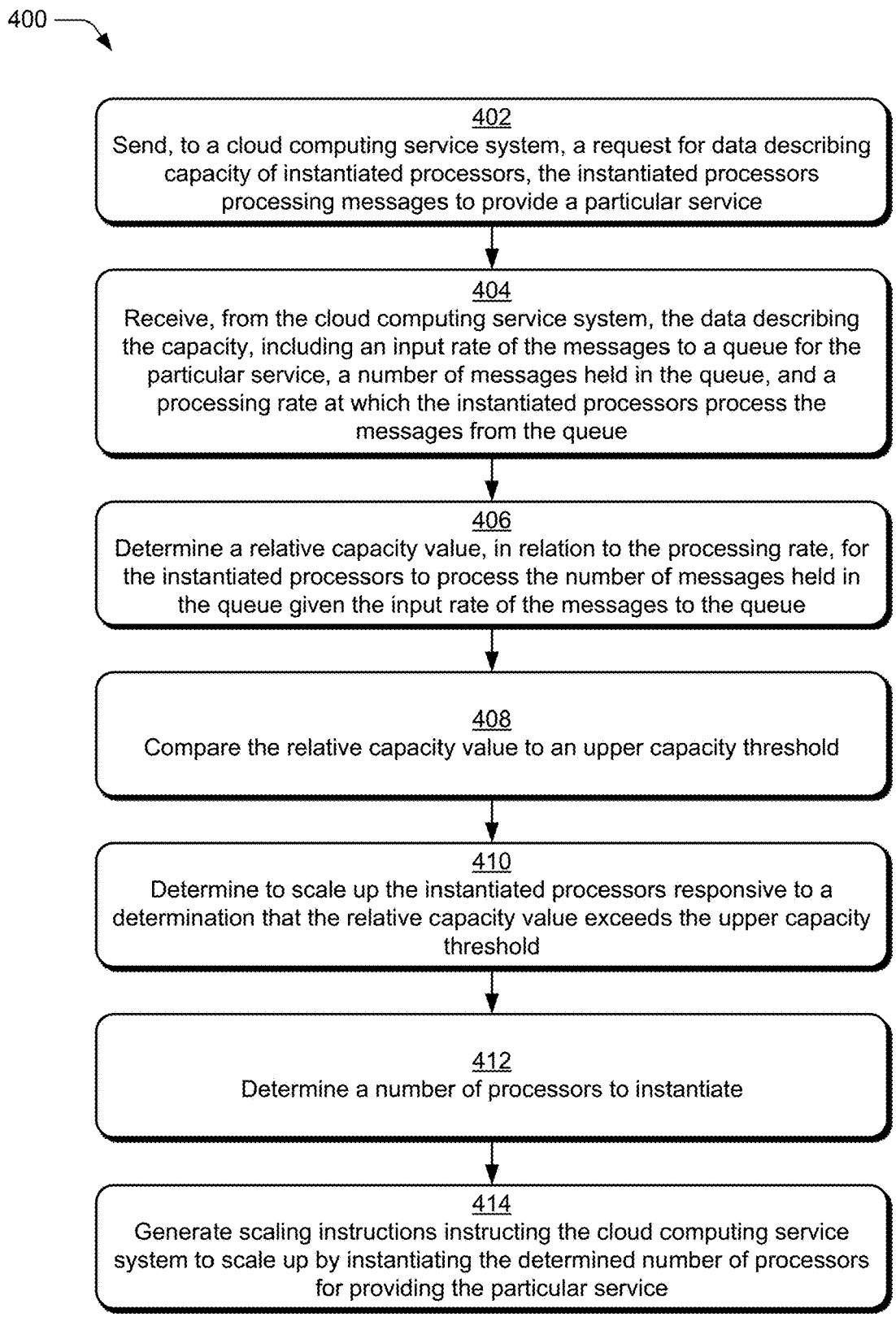
FIG. 4 depicts a procedure in an example implementation in which instructions for scaling up services are generated.

FIG. 4 depicts an example procedure 400 in which instructions for scaling up services are generated.

A request is sent to a cloud computing service system for data describing capacity of processors that are instantiated to process messages in connection with providing a particular service (block 402). By way of example, the capacity measuring module 132 sends the capacity data request 202 to the cloud computing service system 104.

The data describing the capacity is received from the cloud computing service system (block 404). In accordance with the principles discussed herein, the received data includes an input rate of the messages to a queue for the particular service, a number of messages held in the queue, and a processing rate at which the instantiated processors process the messages from the queue. By way of example, the service scaling system 106 receives the capacity data 204 from the cloud computing service system 104. The capacity data 204 received by the service scaling system 106 includes data describing the messages input over time 206, the messages in queue 208, and the service processing rate 210.

A relative capacity value is determined in relation to the processing rate (block 406). In accordance with the principles discussed herein, the relative capacity value corresponds to a value for the instantiated processors to operate in relation to the current processing rate to process the number of messages held in the queue given the input rate of messages to the queue and to maintain a particular quality of service. By way of example, the scaling module 134 determines a relative capacity rate in relation to the service processing rate 210 and based on the messages in queue 208 and the messages input over time 206. Here, the service processing rate 210 corresponds to a rate at which the instantiated processors currently process messages from the respective queue.

The relative capacity value is compared to an upper capacity threshold (block 408). By way of example, the scaling module 134 compares the relative capacity value computed at block 406 with the upper capacity threshold 216.

A determination to scale up the instantiated processors is made responsive to a determination that the relative capacity value exceeds the upper capacity threshold (block 410). By way of example, the scaling module 134 determines based on the comparison at block 408 that the relative capacity value exceeds the upper capacity threshold 216. Responsive to this determination, the scaling module 134 further determines to scale up the instantiated processors, e.g., the scaling module 134 determines to scale up the first service processing modules 116, 118 responsive to determining that the relative capacity value exceeds the upper capacity threshold 216. In scenarios where a determination is made that the relative capacity does not satisfy the upper capacity threshold 216, the scaling module 134 does not scale up the instantiated processors. When a determination is made to scale up, however, the procedure 400 is carried out as follows.

A number of processors to instantiate is determined (block 412). By way of example, the scaling module 134 computes the term NoToStart as described in more detail above—this term is indicative of the number of processors to instantiate in connection with scaling up. Scaling instructions are generated which instruct the cloud computing service system to scale up by instantiating the determined number of processors for providing the particular service (block 414). By way of example, the scaling module 134 generates the service scaling instructions 220, which instruct the cloud computing service system 104 to scale up by instantiating the number of processors determined at block 412.

Figure 5:
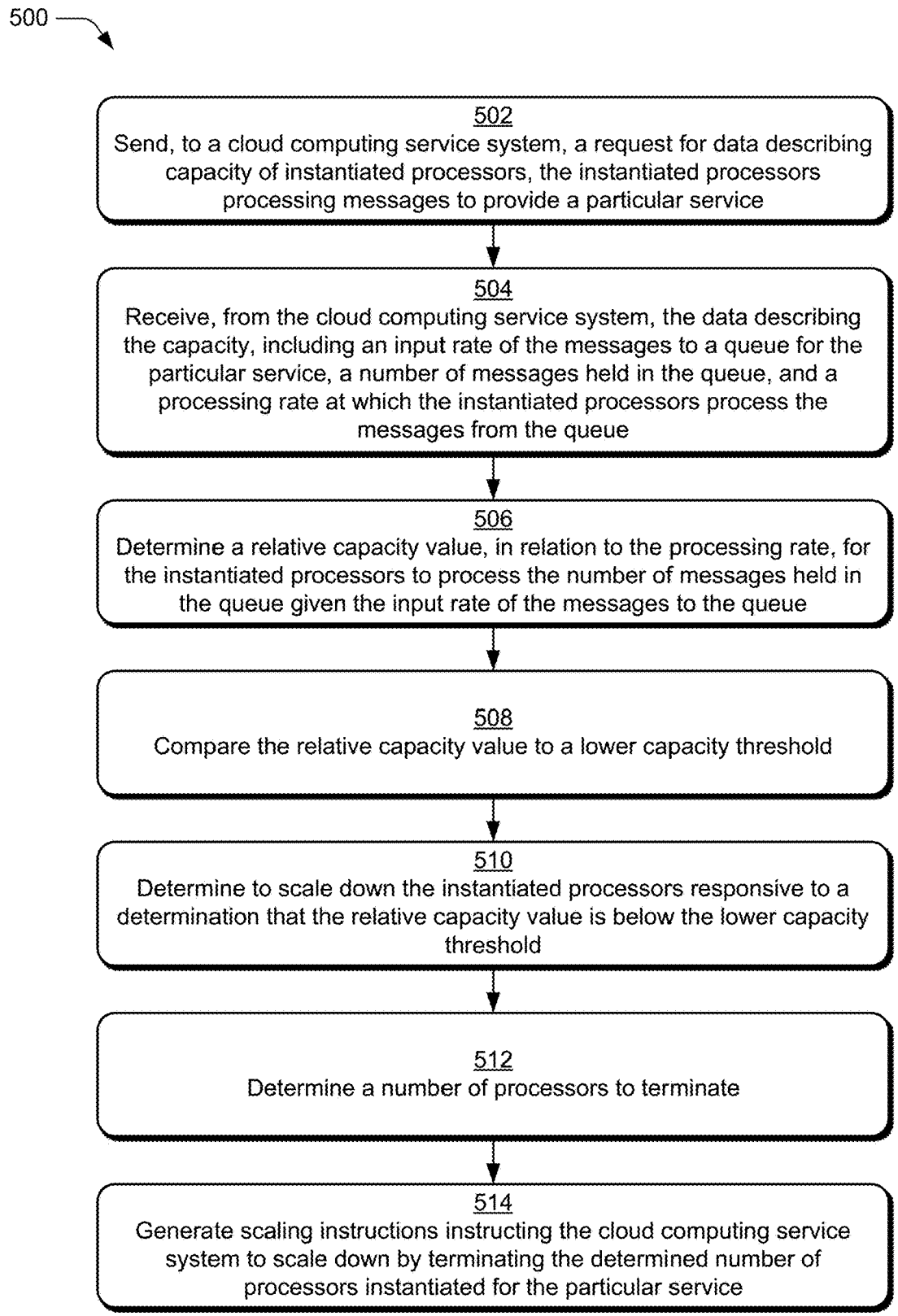
FIG. 5 depicts a procedure in an example implementation in which instructions for scaling services down are generated.

FIG. 5 depicts an example procedure 500 in which instructions for scaling down services are generated. In scenarios where instructions are generated for scaling down, the initial steps of the example procedure 500 are the same as the initial steps of the example procedure 400, namely, blocks 502, 504, 506 correspond to blocks 402, 404, 406. These procedures differ beginning at block 408 and block 508, however.

In connection with procedure 500, these initial blocks 502-506 include the following steps. A request is sent to a cloud computing service system for data describing capacity of processors that are instantiated to process messages in connection with providing a particular service (block 502). The data describing the capacity is received from the cloud computing service system (block 504). In accordance with the principles discussed herein, the received data includes an input rate of the messages to a queue for the particular service, a number of messages held in the queue, and a processing rate at which the instantiated processors process the messages from the queue. A relative capacity value is determined in relation to the processing rate (block 506). In accordance with the principles discussed herein, the relative capacity value corresponds to a value for the instantiated processors to operate in relation to the processing rate to process the number of messages held in the queue given the input rate of messages to the queue and to maintain a particular quality of service. After these initial steps, the procedures 400 and 500 differ in accordance with the following discussion.

The relative capacity value is compared to a lower capacity threshold (block 508). By way of example, the scaling module 134 compares the relative capacity value computed at block 506 with the lower capacity threshold 218.

A determination to scale down the instantiated processors is made responsive to a determination that the relative capacity value is below the lower capacity threshold (block 510). By way of example, the scaling module 134 determines based on the comparison at block 508 that the relative capacity value is below the lower capacity threshold 218. Responsive to this determination, the scaling module 134 further determines to scale down the instantiated processors, e.g., the scaling module 134 determines to scale down the first service processing modules 116, 118 responsive to determining that the relative capacity value is below the lower capacity threshold 218. In scenarios where a determination is made that the relative capacity does not satisfy the lower capacity threshold 218, the scaling module 134 does not scale down the instantiated processors. When a determination is made to scale down, however, the procedure 500 is carried out as follows A number of processors to terminate is determined (block 512). By way of example, the scaling module 134 computes the term NoToStop as described in more detail above—this term is indicative of the number of instantiated processors to terminate in connection with scaling down. Scaling instructions are generated which instruct the cloud computing service system to scale down by terminating the determined number of instantiated processors for the particular service (block 514). By way of example, the scaling module 134 generates the service scaling instructions 220, which instruct the cloud computing service system 104 to scale down by terminating the number of instantiated processors determined at block 412.

Having described example procedures in accordance with one or more implementations, consider now an example system and device that can be utilized to implement the various techniques described herein.

Example System and Device

Figure 6:
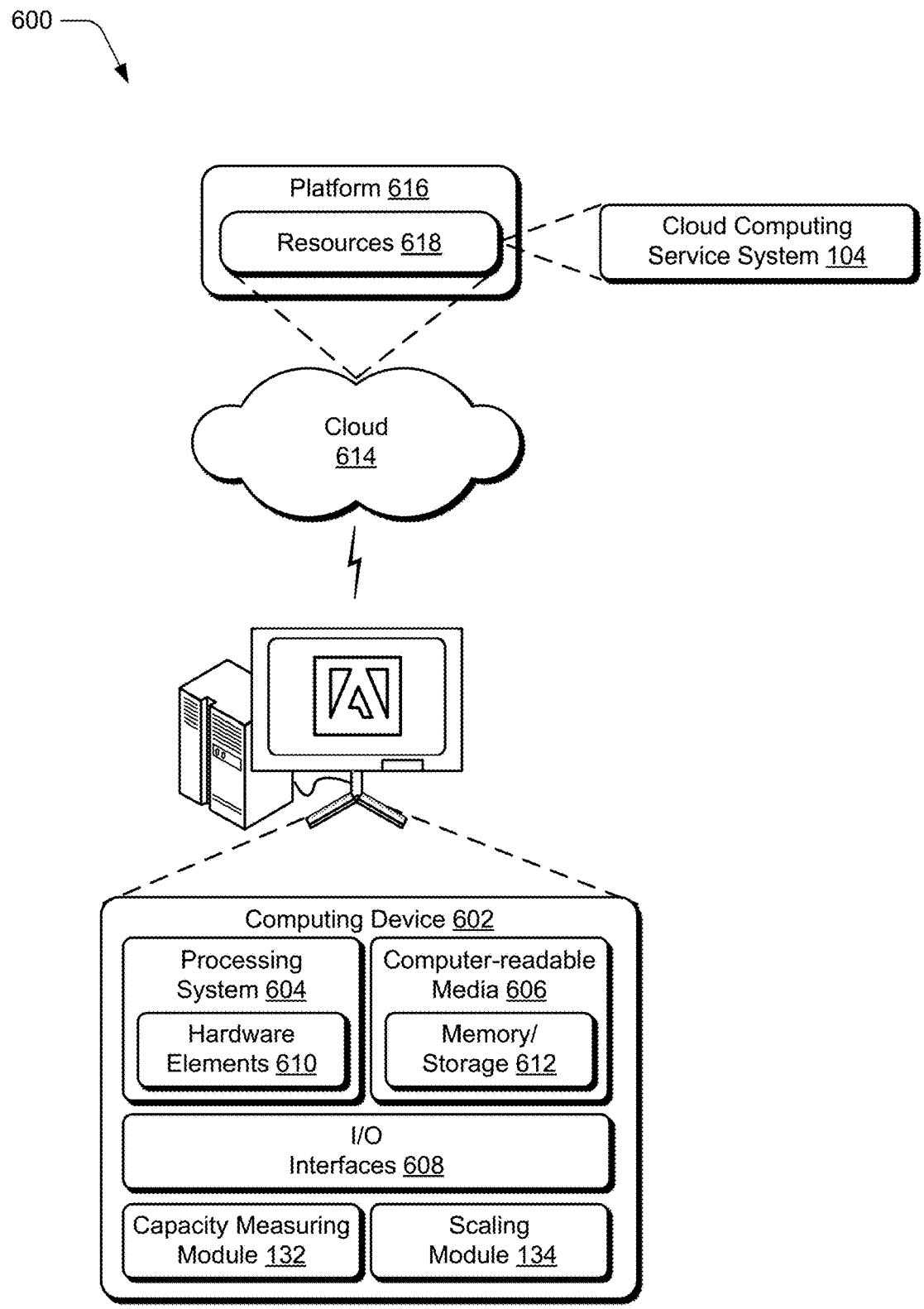
FIG. 6 illustrates an example system including various components of an example device that can be implemented as any type of computing device as described and/or utilized with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the cloud computing service system 104, the capacity measuring module 132, and the scaling module 134. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to maintain a desired quality of service in connection with provision of services while limiting computing resources deployed to provide the services, a method implemented by at least one computing device, the method comprising:
   receiving capacity data from a cloud computing service system, the capacity data describing one or more service processors instantiated at the cloud computing service system to provide a service on behalf of a service provider, the capacity data further describing a queue from which the instantiated service processors process messages to provide the service, including a number of the messages held in the queue at a time associated with a request for the capacity data;
   determining a number of the service processors to instantiate or terminate in connection with scaling the instantiated service processors based on both an input rate of the messages to the queue and the number of messages held in the queue, as described by the capacity data; and
   communicating scaling instructions to the cloud computing service system, the scaling instructions causing the cloud computing service system to instantiate or terminate the number of service processors.

2. A method as described in claim 1, wherein the scaling instructions instruct the cloud computing service system to scale up the instantiated service processors by instantiating the number of service processors.

3. A method as described in claim 1, wherein the scaling instructions instruct the cloud computing service system to scale down the instantiated service processors by terminating the number of service processors.

4. A method as described in claim 1, wherein the input rate corresponds to a number of the messages input to the queue over an interval of time.

5. A method as described in claim 1, further comprising communicating the request for the capacity data to the cloud computing service system.

6. A method as described in claim 1, wherein:
   the capacity data further describes a service processing rate at which the instantiated service processors process the messages from the queue; and
   the number of service providers to instantiate or terminate is further based on the service processing rate.

7. A method as described in claim 6, wherein the service processing rate corresponds to a number of the messages processed by all of the instantiated service processors over an interval of time.

8. A method as described in claim 1, further comprising determining whether to scale the instantiated service processors based on upper and lower capacity thresholds.

9. A method as described in claim 8, further comprising:
   determining a relative capacity in relation to a current service processing rate at which the instantiated service processors process the messages from the queue and for the instantiated service processors to process the messages held in the queue given the input rate;
   comparing the relative capacity to the upper capacity threshold;
   determining that the relative capacity satisfies the upper capacity threshold based on the comparing; and
   responsive to determining that the relative capacity satisfies the upper capacity threshold, including, in the scaling instructions, instructions to scale up by instantiating the number of service processors.

10. A method as described in claim 8, further comprising:
    determining a relative capacity in relation to a current service processing rate at which the instantiated service processors process the messages from the queue and for the instantiated service processors to process the messages held in the queue given the input rate;
    comparing the relative capacity to the lower capacity threshold;
    determining that the relative capacity satisfies the lower capacity threshold based on the comparing; and
    responsive to determining that the relative capacity satisfies the lower capacity threshold, including, in the scaling instructions, instructions to scale down by terminating the number of instantiated service processors.

11. A method as described in claim 1, wherein:
    instantiating the number of service processors includes securing available cloud-based resources for deployment as the service processors are instantiated; and
    terminating the number of instantiated service processors includes returning resources used to deploy the terminated service processors to the available cloud-based resources.

12. A system to maintain a desired quality of service in connection with provision of services while limiting computing resources deployed to provide the services, the system comprising:
    a capacity measuring module implemented at least partially in hardware of at least one computing device to measure:
       capacity of one or more service processors instantiated at a cloud computing service system to provide a service on behalf of a service provider by processing a queue of messages requesting the service;
       an input rate of the messages to the queue; and
       a number of the messages held in the queue at a time associated with a request for capacity data describing the capacity, the input rate, and the number of messages; and
    a scaling module implemented at least partially in the hardware of the at least one computing device to determine a scaling of the instantiated service processors based on the capacity, the input rate, and the number of messages as described by the capacity data.

13. A system as described in claim 12, wherein the scaling module is further configured to generate scaling instructions instructing the cloud computing service system to instantiate or terminate a number of the service processors in connection with the scaling.

14. A system as described in claim 12, wherein the scaling module is further configured to determine a number of the service processors to instantiate or terminate in connection with the scaling.

15. A system as described in claim 14, wherein the number of service processors to instantiate or terminate is based on the capacity, the input rate, and the number of messages.

16. A system as described in claim 15, wherein the number of service processors to instantiate or terminate is further based on upper and lower capacity thresholds received from the service provider.

17. A system as described in claim 12, wherein the capacity measuring module is further configured to request the capacity data from the cloud computing service system.

18. In a digital medium environment to provide a cloud based computing service that deploys computing resources on behalf of other service providers for providing respective services, a method implemented by at least one computing device, the method comprising:
- maintaining a queue from which one or more service processors instantiated on behalf of a service provider process messages to provide a service of the service provider;
- responsive to a request from a scaling service, providing data to the scaling service describing a capacity of instantiated service processors, an input rate of the messages to the queue, and a number of the messages held in the queue at a time associated with the request;
- receiving, from the scaling service, scaling instructions indicating a number of the service processors to instantiate or terminate in connection with a scaling of the service, the number of service processors being based on the capacity, the input rate, and the number of messages; and
- scaling the service by instantiating the number of service processors or by terminating the number of instantiated service processors in accordance with the scaling instructions.

19. A method as described in claim 18, further comprising:
- receiving the messages from clients of the service provider; and
- storing the messages in the queue.

20. A method as described in claim 18, wherein instantiating the number of service processors includes securing available cloud-based resources for deployment as the service processors are instantiated; and terminating the number of instantiated service processors includes returning resources used to deploy the terminated service processors to the available cloud-based resources.

* * * * *